(12) United States Patent
Bonanno et al.

(10) Patent No.: US 7,913,068 B2
(45) Date of Patent: Mar. 22, 2011

(54) SYSTEM AND METHOD FOR PROVIDING ASYNCHRONOUS DYNAMIC MILLICODE ENTRY PREDICTION

(75) Inventors: James J. Bonanno, Wappingers Falls, NY (US); Brian R. Prasky, Wappingers Falls, NY (US); John G. Rell, Jr., Saugerties, NY (US); Anthony Saporito, Highland, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 12/035,109

(22) Filed: Feb. 21, 2008

(65) Prior Publication Data

US 2009/0217002 A1    Aug. 27, 2009

(51) Int. Cl.
  *G06F 9/42* (2006.01)
(52) U.S. Cl. .................................. 712/239; 712/238
(58) Field of Classification Search .................. None
  See application file for complete search history.

(56) References Cited

U.S. PATENT DOCUMENTS

| | | | | |
|---|---|---|---|---|
| 5,280,593 | A * | 1/1994 | Bullions et al. | 712/208 |
| 5,903,751 | A * | 5/1999 | Hoyt et al. | 712/238 |
| 6,055,623 | A * | 4/2000 | Webb et al. | 712/208 |
| 6,055,624 | A | 4/2000 | Webb et al. | |
| 6,058,470 | A | 5/2000 | Webb et al. | |
| 6,067,617 | A | 5/2000 | Webb et al. | |
| 6,671,793 | B1 * | 12/2003 | Swaney et al. | 712/34 |
| 6,898,699 | B2 * | 5/2005 | Jourdan et al. | 712/243 |
| 7,266,676 | B2 | 9/2007 | Tran et al. | |
| 2005/0216713 | A1 | 9/2005 | Prasky et al. | |
| 2006/0036836 | A1 * | 2/2006 | Gelman et al. | 712/238 |
| 2006/0155965 | A1 | 7/2006 | Altman et al. | |

OTHER PUBLICATIONS z/Architecture, Principles of Operation, Sixth Edition, Apr. 2007, Publication No. SA22-7832-05, copyright IBM Corp. 1990-2007, pp. 1-1218.
Chunrong Lai et al., Improving Branch Prediction Accuracy with Parallel Conservative Correctors, CF 2005, Copyright 2005 ACM, 8 pages.
Oliverio J. Santana et al., Branch Predictor Guided Instruction Decoding, PACT 2006, Copyright 2006 ACM, 10 pages.
Chengmo Yang et al., Power Efficient Branch Prediction through Early Identification of Branch Addresses, CASES 2006, Copyright 2007 ACM, 10 pages.
T.J. Siegel et al., The IBM eServer z990 microprocessor, IBM Journal of Research and Development, vol. 43, No. 3/4, May/Jul. 2004, 15 pages.

* cited by examiner

*Primary Examiner* — Eric Coleman
(74) *Attorney, Agent, or Firm* — Cantor Colburn LLP; John Campbell

(57) ABSTRACT

A system and method for asynchronous dynamic millicode entry prediction in a processor are provided. The system includes a branch target buffer (BTB) to hold branch information. The branch information includes: a branch type indicating that the branch represents a millicode entry (mcentry) instruction targeting a millicode subroutine, and an instruction length code (ILC) associated with the mcentry instruction. The system also includes search logic to perform a method. The method includes locating a branch address in the BTB for the mcentry instruction targeting the millicode subroutine, and determining a return address to return from the millicode subroutine as a function of the an instruction address of the mcentry instruction and the ILC. The system further includes instruction fetch controls to fetch instructions of the millicode subroutine asynchronous to the search logic. The search logic may also operate asynchronous with respect to an instruction decode unit.

20 Claims, 4 Drawing Sheets

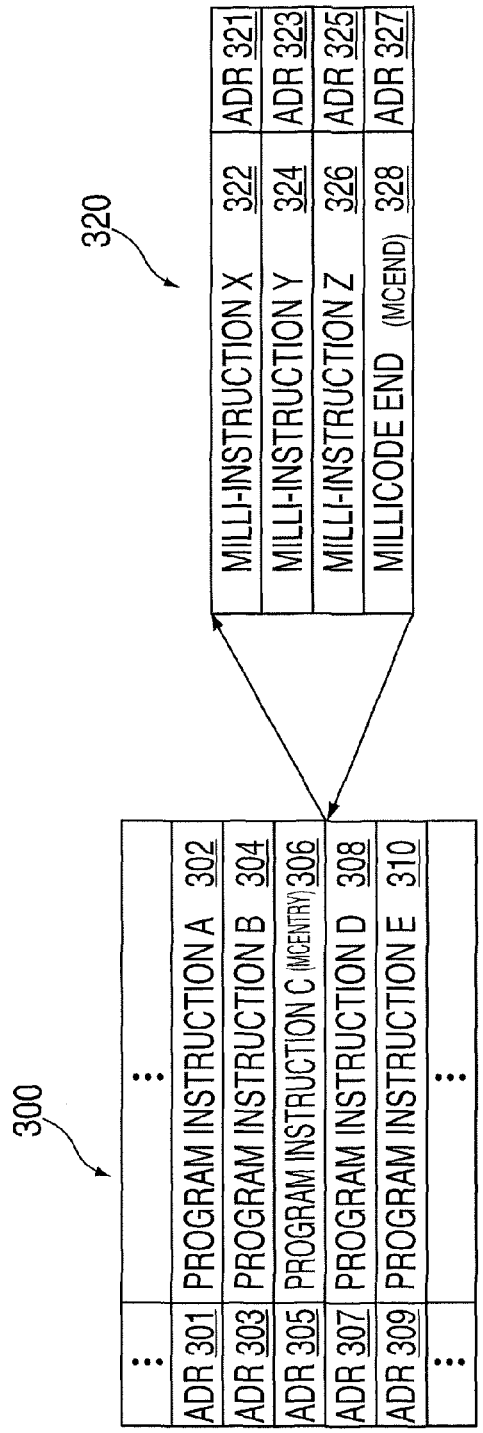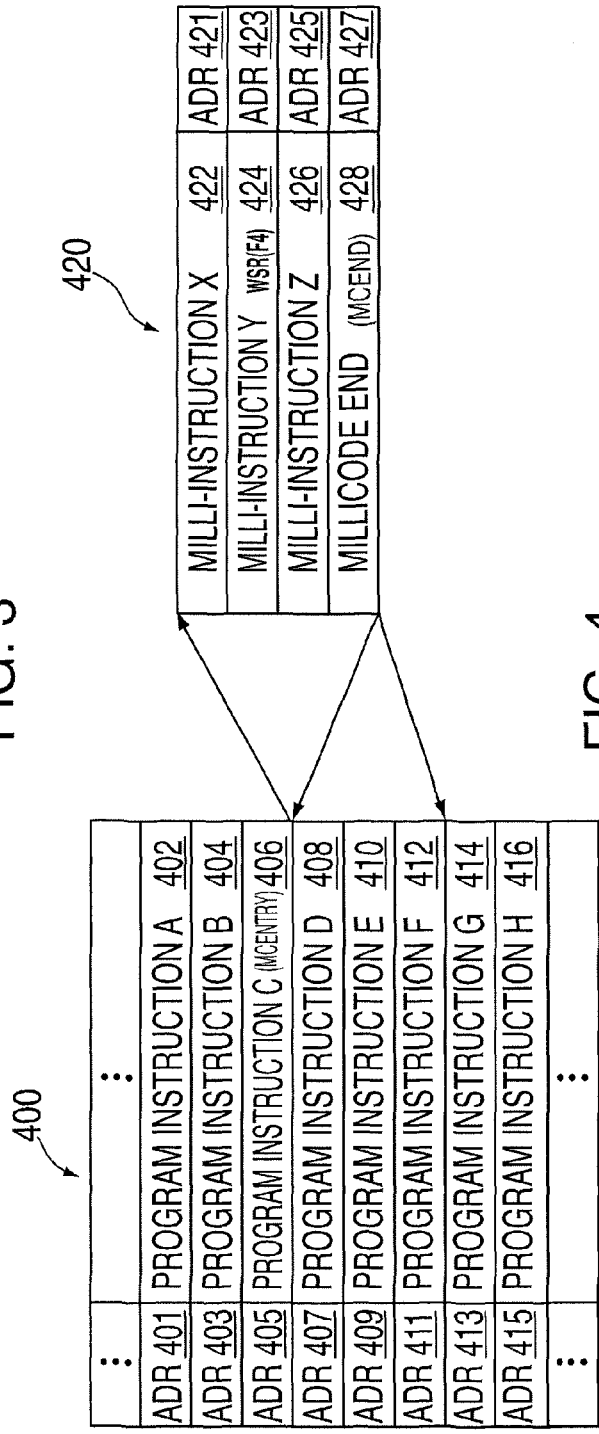
FIG. 3
FIG. 4

SYSTEM AND METHOD FOR PROVIDING ASYNCHRONOUS DYNAMIC MILLICODE ENTRY PREDICTION

BACKGROUND OF THE INVENTION

This invention relates generally to branch prediction in a computer system, and more particularly to providing asynchronous dynamic millicode entry prediction in a processor.

Millicode is internally licensed handwritten low-level code which has access to privileged instructions, and special support hardware designed into a microprocessor. The use of millicode in a high-performance pipelined microprocessor has several key benefits. For instance, using millicode can remove the burden of supporting complex or non-performance critical instructions in hardware at the sub-software level for backwards compatibility in a way that is performance predictable and acceptable. Millicode may provide workarounds to hardware problems by forcing execution of instructions to use millicode. It also allows generation 'N' instructions to be added to the instruction set architecture of a generation 'N−1' processor, given access to privileged and restricted hardware resources.

Executing an instruction in millicode appears like a branch to a subroutine, where the subroutine implements the function of the instruction using a multitude of millicode instructions. This allows a complex sequence of instructions to be executed using a single program instruction. Any program instruction that is executed by a millicode routine can be referred to as a millicode entry point (mcentry). Once a processor redirects to a millicode routine as a result of encountering a mcentry instruction, after some number of instructions that comprise the millicoded sequence, there is a millicode end (mcend) instruction that returns the program back to the sequential program instruction following the mcentry instruction.

A processor pipeline can include multiple functional units, with each unit further divided into multiple stages. Highest performance in the processor is generally achieved by keeping as many of the stages active at the same time as possible and avoiding stopping and restarting the pipeline. For example, the pipeline can include separate units for instruction fetching, decoding, execution, and put away. The flow of instructions through the pipeline is referred to as an instruction stream. One approach to handle encountering a mcentry instruction in an instruction stream is to wait for the instruction to reach the point of decode in the processor pipeline. The target address of the millicode subroutine can be computed and a sequential return address saved. Any younger instructions in the processor pipeline are flushed. The processor pipeline is restarted at the computed target address, allowing an instruction stream for the subroutine to flow through the processor pipeline. Once the return point of the subroutine is reached, a similar flush and restart are performed using the return address. A typical structure used to support this is a call return stack. Upon decoding the branching instruction, the return address is pushed onto a call return stack. When the returning instruction is reached for the subroutine, the flush & reset occurs once again. The return address is popped off of the call return stack and used to restart the pipeline.

While this method is functionally sound, there can be large performance degrading gaps created as part of the flush and restart processes, where cycles occur without advancing instructions through the pipeline. If the target address is not cached locally, the delays can be more severe as multiple levels of memory hierarchy are accessed (e.g., level-2 cache, main memory, disk storage, etc.). The use of a call return stack may prohibit accurate asynchronous branch prediction from proceeding beyond the mcentry instruction.

Many high-performance processors contain a branch target buffer (BTB), which stores branch address and target address bits associated with a given branch. This mechanism can be used to enhance the performance of executing subroutines by predicting in advance when a branch to a subroutine will occur, and predicting to where it will return. However, this mechanism does have some limitations. Existing BTB designs lack awareness of being in predicted millicode address space, as well as the ability to save off a return point that can be modified and used as the target of the routine ending branch.

Therefore, it would be beneficial to improve the handling of entry and return from millicode subroutines to enhance prediction capabilities and delays associated with pipeline flushes. Accordingly, there is a need in the art for providing asynchronous dynamic millicode entry prediction in a processor.

BRIEF SUMMARY OF THE INVENTION

An exemplary embodiment includes a system for providing asynchronous dynamic millicode entry prediction in a processor. The system includes a branch target buffer (BTB) to hold branch information. The branch information includes: a branch type indicating that the branch represents a millicode entry (mcentry) instruction targeting a millicode subroutine, and an instruction length code (ILC) associated with the mcentry instruction. The system also includes search logic to perform a method. The method includes locating a branch address in the BTB for the mcentry instruction targeting the millicode subroutine, and determining a return address to return from the millicode subroutine as a function of the an instruction address of the mcentry instruction and the ILC. The system further includes instruction fetch controls (IFC) to fetch instructions of the millicode subroutine asynchronous to the search logic. The search logic may also operate asynchronous with respect to an instruction decode unit (IDU).

Another exemplary embodiment includes a method for asynchronous dynamic millicode entry prediction in a processor. The method includes searching a BTB to locate a branch address for a mcentry instruction targeting a millicode subroutine. The BTB includes: a branch type indicating that the branch represents the mcentry instruction, and an ILC associated with the mcentry instruction. The method also includes determining a return address to return from the millicode subroutine as a function of an instruction address of the mcentry instruction and the ILC. The method additionally includes fetching instructions of the millicode subroutine asynchronous to the searching.

A further exemplary embodiment includes a system for providing asynchronous dynamic system code entry prediction in a processor. The system includes a BTB to hold branch information. The branch information includes a branch type indicating that a predicted subroutine is a system code subroutine, the system code providing access to modify the state of the processor. The system also includes search logic to perform a method. The method includes locating a branch address in the BTB for an instruction targeting the predicted subroutine, and locating a return address to return from the predicted subroutine. The system further includes IFC to fetch instructions of the predicted subroutine asynchronous to the search logic. The search logic may also operate asynchronous with respect to an instruction decode unit (IDU).

BRIEF DESCRIPTION OF THE DRAWINGS

Referring now to the drawings wherein like elements are numbered alike in the several FIGURES:

FIG. 3 depicts an exemplary flow of instructions including a branch to and return from millicode;

FIG. 4 depicts an exemplary flow of instructions including a branch to and a modified return from millicode.

DETAILED DESCRIPTION OF EXEMPLARY EMBODIMENTS

An exemplary embodiment of the present invention provides asynchronous dynamic millicode entry prediction in a processor. Using a history-based structure, such as a branch target buffer (BTB), a processor can dynamically predict millicode entry instructions, target addresses, and return points asynchronously with respect to instruction fetching and decoding. In an exemplary embodiment, predictions are made within millicode routines without aliasing. Although the target address stored in the BTB has fewer than all address bits needed to fully resolve an absolute address, a branch type indicator is provided in the BTB to indicate that the target address is in millicode. Confining millicode to specific regions in a processor memory map coupled with the branch type indicator removes aliasing issues that could otherwise occur with a reduced width target address in the BTB. Support is also provided for updating the return address to account for the millicode subroutine modifying its own return point. Knowledge of being in the predicted millicode space also allows for proper addressing in accessing various levels of memory hierarchy (e.g., level-1 cache, level-2 cache, main memory, disk storage, etc.), as addressing requirements may change between program instructions and millicode instructions.

Figure 1:
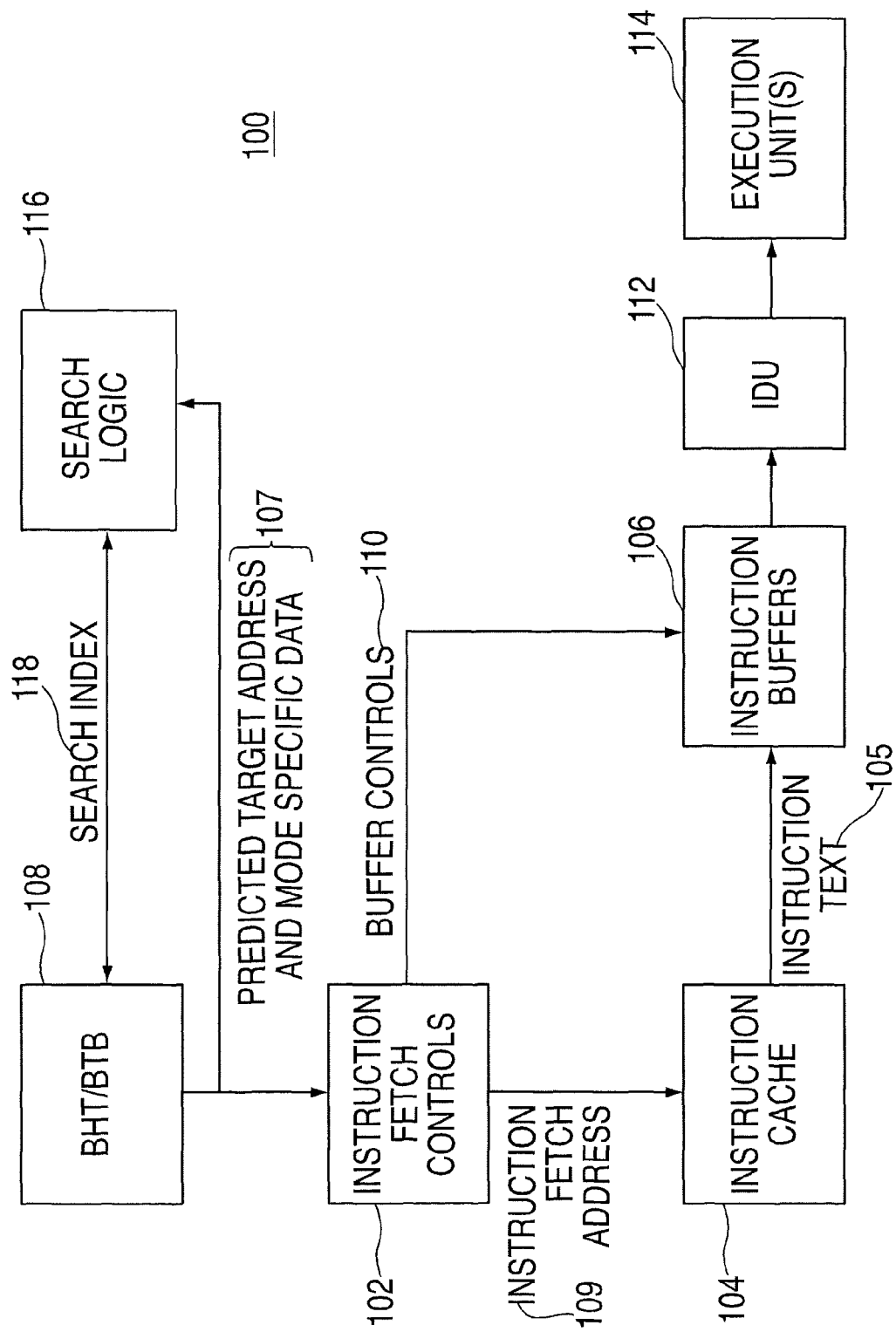
FIG. 1 depicts a block diagram of a system in a processor upon which asynchronous dynamic millicode entry prediction may be performed in an exemplary embodiment.

Turning now to the drawings in greater detail, it will be seen that in FIG. 1 a block diagram of a system 100 in a processor upon which providing asynchronous dynamic millicode entry prediction may be performed is depicted in accordance with an exemplary embodiment. The system 100 includes an instruction fetch controls (IFC) 102 that acquires instructions from an instruction cache 104, passing instruction text 105 to instruction buffers 106.

To increase efficiency in the system 100, branch prediction may be performed. In support of branch prediction, the IFC 102 utilizes BTB 108. When the BTB 108 finds a new predicted branch, it presents the branch's target address as well as mode specific data 107 to the IFC 102, such as whether a branch type is a millicode branch and an instruction length code associated with the predicted branch.

The IFC 102 sends a fetch for the target address as instruction fetch address 109 to the instruction cache 104, which in turn sends the instruction text 105 to the instruction buffers 106. In addition to initiating the fetch, the IFC 102 also provides the instruction buffers 106 with buffer controls 110 to control temporary storage of instruction text 105 prior to decoding. The instruction buffers 106 provide instructions to an instruction decode unit (IDU) 112. The IDU 112 passes the instructions in an instruction stream to one or more execution units 114. The execution units 114 may support multiple paths for instruction execution, e.g., a superscalar architecture.

Figure 2:
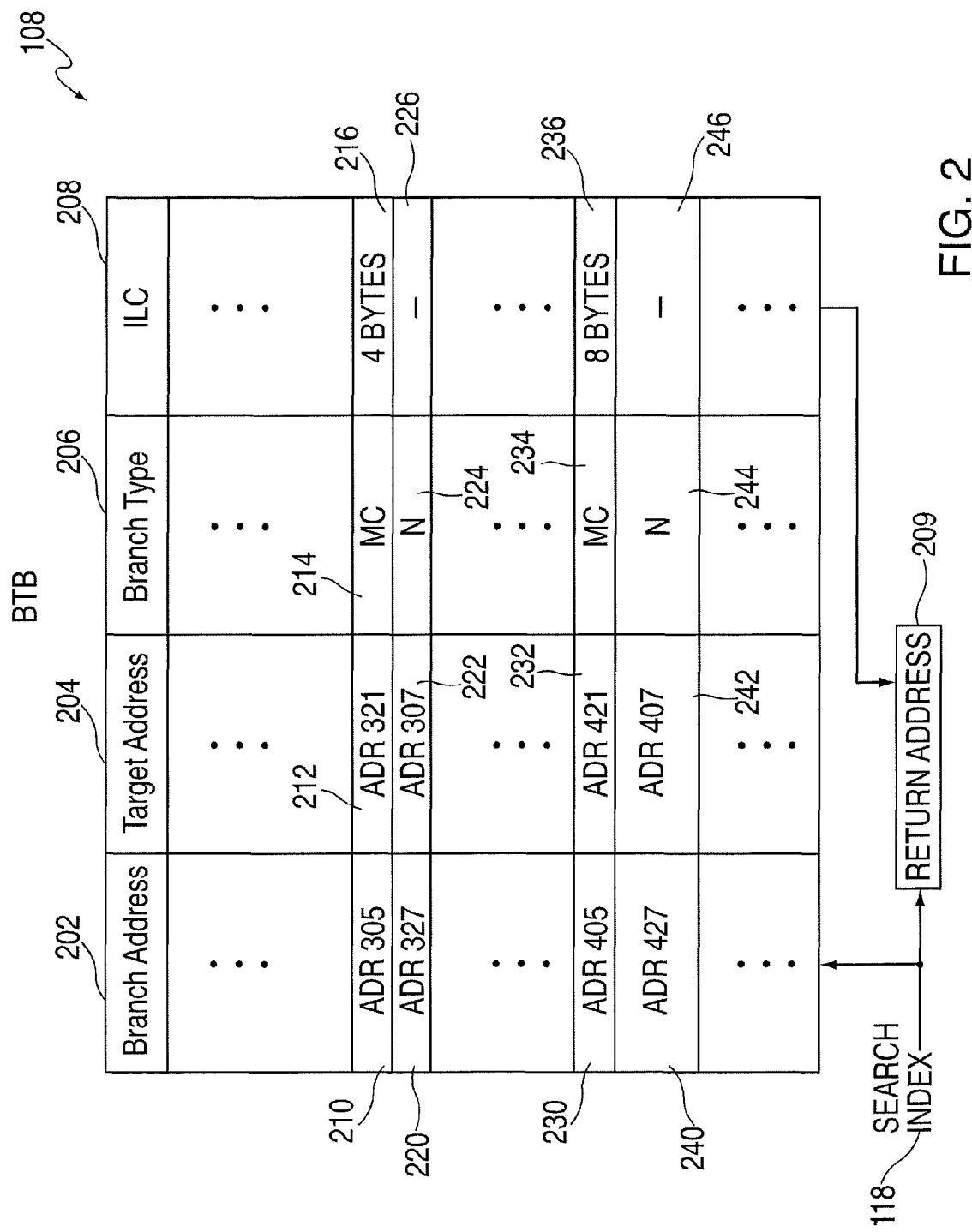
FIG. 2 depicts contents of a BTB in accordance with an exemplary embodiment.

In an exemplary embodiment, the BTB 108 is searched in parallel to and independently from instruction fetching performed by the IFC 102. Search logic 116 performs searching of the BTB 108 using search index 118 to locate entries in the BTB 108. FIG. 2 depicts contents of the BTB 108 of FIG. 1 in accordance with an exemplary embodiment. The BTB 108 includes multiple fields for a branch address 202, a target address 204, a branch type 206, and an instruction length code (ILC) 208 associated with the instruction at the branch address 202. Although only a limited number of fields 202-208 are depicted in the BTB 108, it will be understood that the BTB 108 can include other fields and access control logic known in the art. The actual values stored in the BTB 108 for branch addresses and target addresses, e.g., branch address 202 and target address 204, may be address segments sufficient to identify specific addresses. Furthermore, the fields 202-208 can be divided into two or more separate tables, where the BTB 108 represents any history storage structure known in the art. In an exemplary embodiment, when a search of the BTB 108 is performed for branch prediction, the branch address 202 is located and the corresponding target address 204 is selected and returned to the IFC 102 of FIG. 1. The BTB 108 also returns the branch type 206 to indicate whether the branch is to a millicode subroutine. The ILC 208 can be employed to indicate the number of bytes in the millicode entry point (mcentry) instruction that called the millicode subroutine associated with the target address 204. This can be used to calculate a return address 209 upon a millicode end (mcend) instruction that returns back to a sequential program instruction following the mcentry instruction. The branch type 206 and ILC 208 are also referred to as mode specific data. Millicode is typically executed in a special mode of operation, referred to as millimode, which allows access to privileged instructions. Millicode is system code that can modify the state of the processor. Therefore, predictions occurring in millicode may require special processing to avoid inadvertent fetching of instructions beyond the end of a millicode subroutine, as this could lead to an access exception.

When a mcentry instruction that was not found in (predicted by) the BTB 108 is completed, an entry for it is written into the BTB 108, including the mode specific data. A mcentry instruction is not a formal branch instruction, but it is an instruction that is treated like a branch instruction to implement a sequence of millicode instructions. At prediction time, the target address 204 of the mcentry (i.e., the starting location of the millicode subroutine) is pulled from the BTB 108 in similar fashion as a target of a predicted taken branch in normal program instructions. The target address 204 is fed back into the search logic 116 of FIG. 1 to modify the search index 118. The target address 204 is also used by the IFC 102 to fetch instruction text 105 of the millicode instructions in the millicode subroutine. Once the BTB 108 predicts a mcentry, further searching only produces a hit if the branch type 206 indicates that the entry is in a millicode subroutine until the end of the millicode subroutine is reached. This feature prevents aliasing while searching in millicode address space. Millispace alias prevention avoids functional problems within millicode routines that could otherwise access and modify parts of the processor design/architecture.

After the prediction of an mcentry instruction, an indication of fetching in millicoded space is forwarded to the instruction cache 104 via the IFC 102, since address translation can be different while in a millicode routine compared to that of the program instructions before and after it. For example, millicode may not require instruction address translation, while user code calling the millicode routine may require address translation. Address translation is a form of address remapping, e.g., converting a partial address into an absolute address.

The return point for the next mcend is calculated at mcentry prediction time. This can be calculated using the search index 118, which implies part of the instruction address of the mcentry (e.g., branch address 202), tag bits of the associated mcentry prediction (not depicted) may imply more of the address, along with the ILC 208. The return address 209 is saved off and is used in whole or in part as the target address 204 of the mcend for the millicode subroutine, should the BTB 108 predict it.

The BTB 108, as depicted in FIG. 2, includes specific example values, which are described in greater detail in reference to FIGS. 3 and 4. An example of an instruction sequence 300 is depicted in FIG. 3. The instruction sequence 300 includes multiple program instructions 302, 304, 306, 308 and 310 at addresses 301, 303, 305, 307 and 309 respectively. In an exemplary embodiment, program instruction 306 is a mcentry, requiring a subroutine 320 of milli-instructions to perform the functionality of the program instruction. A branch address 210 in the BTB 108 of FIG. 2 with a value of address 305 enables prediction of milli-instruction 322 at address 321 via target address 212. Branch type 214 indicates that the code to be executed at the target address 212 is millicode. ILC 216 specifies that mcentry instruction (i.e., program instruction 306) is 4 bytes in length. This value is used to calculate return address 209 upon reaching mcend 328 for the subroutine 320 of milli-instructions. The IFC 102 proceeds to fetch milli-instructions 324, 326 and 328 at addresses 323, 325 and 327 respectively. Should additional branches to other millicode subroutines occur, the BTB 108 may predict those as well. The BTB 108 can also predict a return from millimode to normal mode using branch address 220 with a value of address 327 returning to target address 222 with a value of address 307 (i.e., the program instruction following the mcentry). Branch type 224 may indicate the branch is returning to normal mode so any changes to address translation can be performed by the IFC 102 and/or the instruction cache 104 of FIG. 1. ILC 226 need not be populated with a value since the associated target branch is not to millicode. The return address 209 for the subroutine 320 of milli-instructions may be calculated at mcentry prediction time using a combination of the search index 118 of FIG. 1 or branch address 210 with the ILC 216. The search index 118 may be used to calculate the return address 209 when the branch address 210 contains an insufficient number of address bits to fully calculate the return address 209. In an exemplary embodiment, the return address 209 is saved external to the BTB 108. Alternatively, the return address 209 may be incorporated in whole or in part in the BTB 108.

It is possible for a millicode routine to modify its return point, for instance, through the use of a write special register (WSR) instruction. This modification is taken into account by adjusting the return address 209 to reflect the change. An example of this is depicted in instruction sequence 400 in FIG. 4, which is described in reference to the system 100 of FIG. 1 and the BTB 108 entries of FIG. 2. The instruction sequence 400 includes multiple program instructions 402, 404, 406, 408, 410, 412, 414 and 416 at addresses 401, 403, 405, 407, 409, 411, 413 and 415 respectively. In an exemplary embodiment, program instruction 406 is a mcentry, requiring a subroutine 420 of milli-instructions to perform the functionality of the program instruction. Similar to the description in reference to FIG. 3, a branch address 230 in the BTB 108 of FIG. 2 with a value of address 405 enables prediction of milli-instruction 422 at address 421 via target address 232. Branch type 234 indicates that the code to be executed at the target address 232 is millicode. ILC 236 specifies that mcentry instruction (i.e., program instruction 406) is 8 bytes in length. This value is used to calculate return address 209 upon reaching mcend 428 for the subroutine 420 of milli-instructions. The IFC 102 of FIG. 1 proceeds to fetch milli-instructions 424, 426 and 428 at addresses 423, 425 and 427 respectively.

The BTB 108 can also predict a return from millimode to normal mode using branch address 240 with a value of address 427 returning to target address 242 with a value of address 407 (i.e., the program instruction following the mcentry). However, in the example depicted in FIG. 4, milli-instruction 424 modifies the return point for the subroutine 420 of milli-instructions. To handle the change, the return address 209 is updated as address 413. The return address 209 may be blocked from changing if the IFC 102 of FIG. 1 fetched and buffered off the return stream to the instruction buffers 106 based on the earlier calculated return point. Supporting dynamic changes to the return point of a millicode subroutine can prevent flushing and restarting of fetching and prediction logic that would otherwise result. Branch type 244 may indicate the branch is returning to normal mode (i.e., standard/user program instructions) so any changes to address translation can be performed by the IFC 102 and/or the instruction cache 104 of FIG. 1. ILC 246 need not be populated with a value since the associated target branch is not to millicode.

Figure 5:
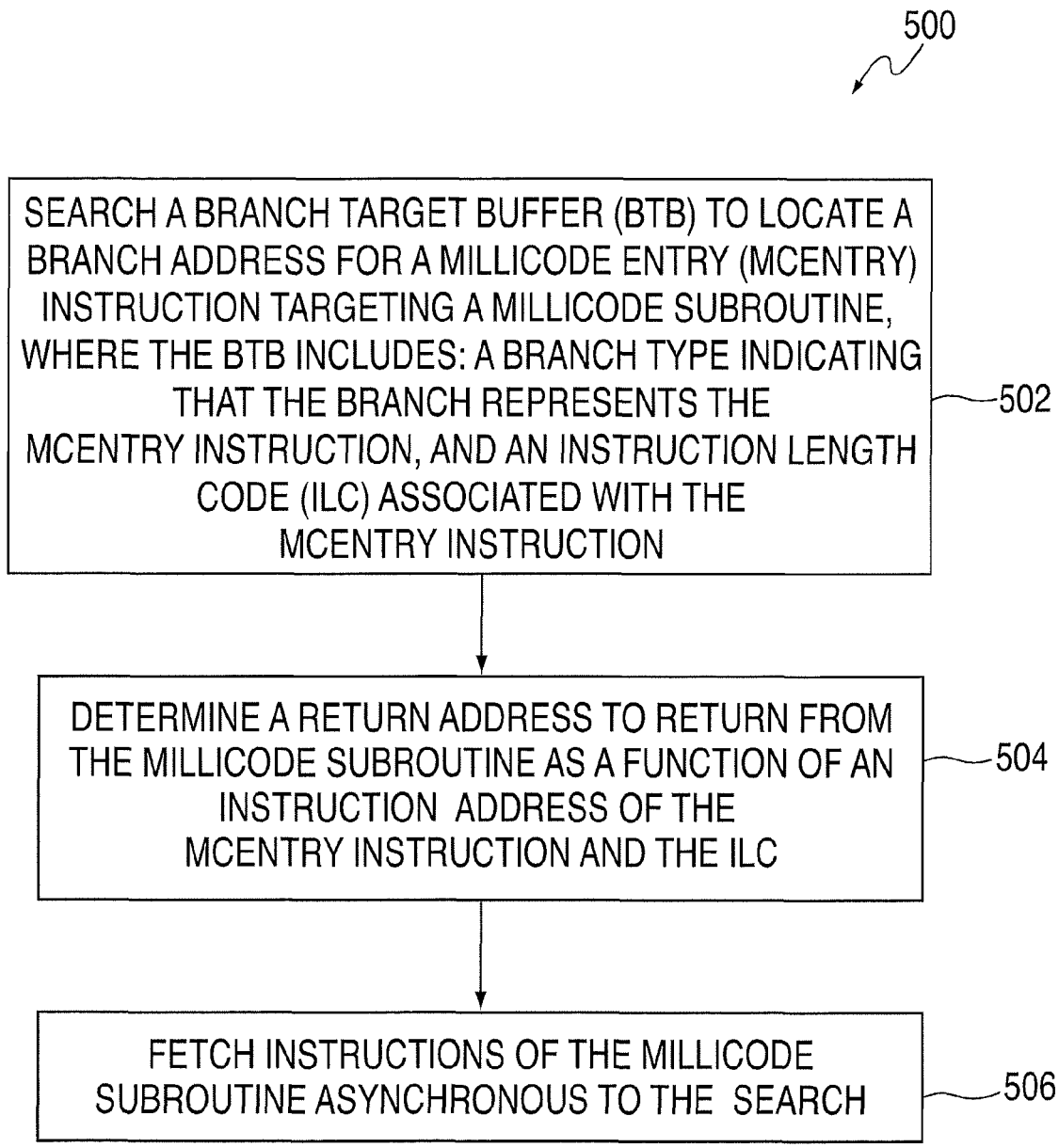
FIG. 5 depicts a process for performing asynchronous dynamic millicode entry prediction in a processor in accordance with an exemplary embodiment.

Turning now to FIG. 5, a process 500 for providing asynchronous dynamic millicode entry prediction in a processor will now be described in reference to FIGS. 1-4, and in accordance with an exemplary embodiment. The IFC 102 fetches instructions from the instruction cache 104, which may include a mcentry (e.g., entry point into low-level system code providing access to modify the state of the processor) for a millicode (or system code) subroutine at branch address 202. At block 502, the search logic 116 searches the BTB 108 to locate branch address 202. The searching may be performed via assigning the search index 118 equal to the instruction address of the mcentry instruction, and incrementing the search index 118 until the branch address 202 is located in the BTB 108. The BTB 108 holds branch information including a target address 204 of a predicted subroutine and a branch type 206 associated with the branch address 202. In response to locating the branch address 202, the search index 118 is updated to the starting instruction address of the predicted millicode subroutine. The BTB 108 may include ILC 208 associated with a mcentry instruction. The branch information is returned to the IFC 102.

At block 504, the search logic 116 determines and/or locates a return address 209 to return from the millicode subroutine as a function of the ILC 208. The return address can be based on the search index 118 and/or the branch address 202 in combination with the ILC 208 associated with the calling mcentry instruction. The return address 209 can be modified in response to a millicode (or system code instruction) changing the return point from the subroutine.

At block 506, the IFC 102 fetches instructions of the millicode subroutine asynchronous to the search logic 116. The search logic 116 may also operate asynchronous to the IDU 112, allowing prediction before decoding. Using the branch prediction information in the BTB 108, instruction fetching can proceed seamlessly from program instructions to millicode and back to program instructions, even when the millicode dynamically adjusts its return point to the program instructions.

It will be understood that the process 500 can be applied to any processing circuitry that incorporates a processor pipeline. For example, the process 500 can be applied to various digital designs, such as a microprocessor, an application specific integrated circuit (ASIC), a programmable logic device (PLD), or other such digital devices capable of processing instructions. Therefore, the system 100 of FIG. 1 can represent a variety of digital designs that incorporate processing circuitry, referred to collectively as processors.

Technical effects and benefits include providing asynchronous dynamic millicode entry prediction in a processor. Adding support to a BTB to identify a branch type as targeting millicode allows the processor to predicatively fetch instructions without stalling and restarting the processing pipeline. By adjusting return address dynamically to changes in the return point of a millicode subroutine, prediction logic can handle a wide range of complex scenarios. Using a branch type indicator and an ILC protects against aliasing in millicode branch predictions and accounts for variable instruction lengths of a mcentry instruction to accurately determine the return address.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A system for providing asynchronous dynamic millicode entry prediction in a processor, the system comprising:
   a branch target buffer (BTB) to hold branch information, wherein the branch information includes: a branch type indicating that the branch represents a millicode entry (mcentry) instruction targeting a millicode subroutine, and an instruction length code (ILC) associated with the mcentry instruction;
   search logic performing a method comprising:
      locating a branch address in the BTB for the mcentry instruction targeting the millicode subroutine; and
      determining a return address to return from the millicode subroutine as a function of the an instruction address of the mcentry instruction and the ILC; and
   instruction fetch controls (IFC) to fetch instructions of the millicode subroutine asynchronous to the search logic.

2. The system of claim 1 wherein the branch address is a segment of the instruction address of the mcentry instruction.

3. The system of claim 1 wherein the method performed by the search logic further comprises:
   assigning a search index for searching the BTB to a starting instruction address of the millicode subroutine in response to locating the branch address.

4. The system of claim 3 wherein the return address is further calculated as a function of the search index.

5. The system of claim 1 wherein the branch type is provided to the IFC to modify instruction address translation in response to the branch type.

6. The system of claim 1 wherein the return address is modified in response to a millicode instruction.

7. The system of claim 1 wherein the search logic operates asynchronous with respect to an instruction decode unit.

8. A method for asynchronous dynamic millicode entry prediction in a processor, the method comprising:
   searching a branch target buffer (BTB) to locate a branch address for a millicode entry (mcentry) instruction targeting a millicode subroutine, wherein the BTB includes: a branch type indicating that the branch represents the mcentry instruction, and an instruction length code (ILC) associated with the mcentry instruction;
   determining a return address to return from the millicode subroutine as a function of an instruction address of the mcentry instruction and the ILC; and
   fetching instructions of the millicode subroutine asynchronous to the searching.

9. The method of claim 8 wherein the branch address is a segment of the instruction address of the mcentry instruction.

10. The method of claim 8 wherein the searching further comprises:
    assigning a search index for searching the BTB to a starting instruction address of the millicode subroutine in response to locating the branch address.

11. The method of claim 10 wherein the return address is further calculated as a function of the search index.

12. The method of claim 8 further comprising:
    providing the branch type to instruction fetch controls (IFC) to modify instruction address translation in response to the branch type.

13. The method of claim 8 wherein the return address is modified in response to a millicode instruction.

14. The method of claim 8 wherein the search logic operates asynchronous with respect to an instruction decode unit.

15. A system for providing asynchronous dynamic system code entry prediction in a processor, the system comprising:
    a branch target buffer (BTB) to hold branch information, wherein the branch information includes a branch type indicating that a predicted subroutine is a system code subroutine, the system code providing access to modify the state of the processor;
    search logic performing a method comprising:
       locating a branch address in the BTB for an instruction targeting the predicted subroutine; and
       locating a return address to return from the predicted subroutine; and
    instruction fetch controls (IFC) to fetch instructions of the predicted subroutine asynchronous to the search logic.

16. The system of claim 15 wherein the return address is calculated as a function of the branch address.

17. The system of claim 15 wherein the method performed by the search logic further comprises:
    assigning a search index for searching the BTB to a starting instruction address of the predicted subroutine in response to locating the branch address.

18. The system of claim 17 wherein the return address is calculated as a function of the search index.

19. The system of claim 15 wherein the branch type is provided to the IFC to modify instruction address translation in response to the branch type.

20. The system of claim 15 wherein the return address is stored external to the BTB, and the return address is modified in response to a system code instruction.

* * * * *